(Model.)
A. N. WINNER.
MEANS OF JOINING STEAM, GAS AND WATER PIPES AND FITTINGS.
No. 248,974. Patented Nov. 1, 1881.
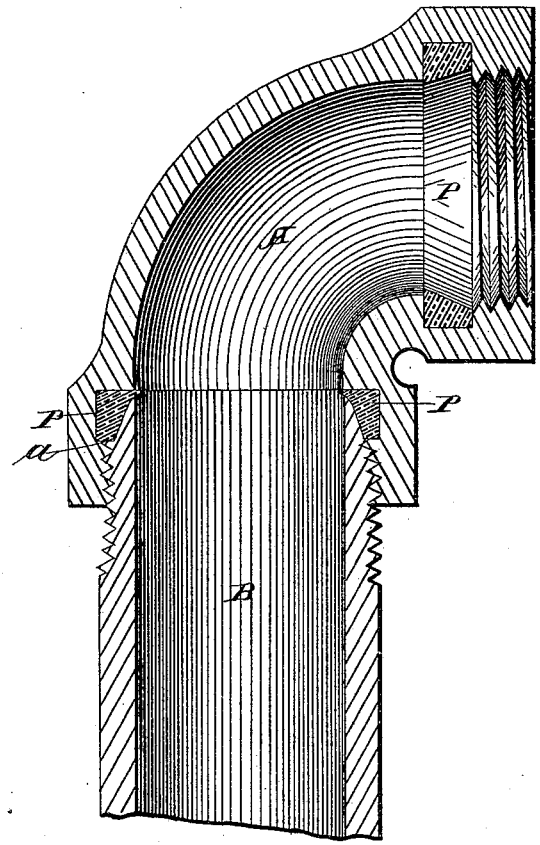
Witnesses.
Chas Wren
U. E. Wren
Inventor.
Adam N Winner
by his attorney
W C Wren

UNITED STATES PATENT OFFICE.

ADAM N. WINNER, OF BROOKLYN, NEW YORK, ASSIGNOR TO JOSEPH ANNIN, OF SAME PLACE.

MEANS OF JOINING STEAM, GAS, AND WATER PIPES AND FITTINGS.

SPECIFICATION forming part of Letters Patent No. 248,974, dated November 1, 1881.

Application filed June 20, 1881. (Model.)

*To all whom it may concern:*

Be it known that I, ADAM N. WINNER, of the city of Brooklyn, State of New York, have invented a new and Improved means of Joining Gas, Steam, and Water Pipes and Fittings, and the same has not, to my knowledge or with my consent, been patented in any foreign country, and the same has not been in public use for more than two years in the United States.
The following is an exact description of the same, reference being had to the accompanying drawing and letters of reference marked thereon.

The object of my invention is to form a more perfect joint between a pipe and its different fittings than the thread or screw joint will make.

The figure on drawing is a longitudinal section through the center of pipe B and fitting A.

To accomplish the desired result, in addition to the usual thread tapped into the fitting A, I recess or groove a place inside of said fitting just beyond the thread marked *a*, in which groove I fit a lead or other suitable packing material or ring, (marked P.) The width and thickness of the packing P will vary with the size of the pipe and fitting used. The pipe B is threaded with a male screw in the usual manner, and the end of the pipe B is turned smooth to a bevel edge, so that the end of the pipe B will become seated firmly onto the packing P.

It has been usual to depend on the screw-thread alone on the pipe with the counter-thread in the fitting.

What I claim as my invention is—

1. In pipe-fittings, the screw-threaded section provided with a beveled end, in combination with the screw-threaded section provided with a recess into which is inserted a suitable metal packing, substantially as described.

2. The combination of section A, having recess *a*, with section B, beveled as described, and packing P, substantially as set forth.

ADAM N. WINNER.

Witnesses:
WILLIAM H. MARTIN,
GEORGE L. BENTON.